US005538218A

United States Patent [19]

Patitsas et al.

[11] Patent Number: 5,538,218
[45] Date of Patent: Jul. 23, 1996

[54] TIRE CURING BLADDER WITH IMPROVED RELEASE FROM THE TIRE INNERLINER

[75] Inventors: George P. Patitsas, Kent; Paul H. Sandstrom, Tallmadge; Bharat K. Kansupada, Mogadore, all of Ohio

[73] Assignee: The Goodyear Tire & Rubber Company, Akron, Ohio

[21] Appl. No.: 313,953

[22] Filed: Sep. 28, 1994

[51] Int. Cl.$^6$ ............................ B29C 35/00; C08F 210/08
[52] U.S. Cl. ............................ 249/65; 156/401; 264/315; 264/326; 425/39; 425/52
[58] Field of Search ............................ 264/127, 117, 264/130, 131, 315, 326; 249/65; 425/35, 39, 52; 156/401

[56] References Cited

U.S. PATENT DOCUMENTS

| | | | |
|---|---|---|---|
| 3,932,088 | 1/1976 | Harada et al. | 249/65 |
| 3,967,968 | 7/1976 | Stone et al. | |
| 4,310,427 | 1/1982 | Wun | |
| 4,333,977 | 6/1982 | Abrahams et al. | 264/127 |
| 4,407,988 | 10/1983 | Abrahams et al. | 264/117 |
| 4,863,650 | 9/1989 | Kohler et al. | |
| 5,063,268 | 11/1991 | Young | |
| 5,162,409 | 11/1992 | Mroczkowski | |
| 5,238,991 | 8/1993 | Magnus et al. | |

FOREIGN PATENT DOCUMENTS

0344021A2   11/1990   European Pat. Off.

OTHER PUBLICATIONS

"Standard Test Methods for Vulcanized Rubber and Thermoplastic Rubbers and Thermoplastic Elastomers–Tension", published by ASTM; Philadelphia, PA (1992) ASTM D412–92.

"Butyl and Chlorobutyl™ Rubber", (Chapter 10) pp. 249–273, of *Rubber Technology*, 2nd Ed., edited by Maurice Morton, published by Robert E. Krieger Publishing Co.: Malabar, Florida, 1973.

Trade Literature from Exxon Chemical Company: Houston, Texas, apparently published Oct., 1993, consisting of 68 printed pages including general fliers, specification sheets, and tire curing bladder recipes all related to Exxpro™ products.

*Primary Examiner*—Mathieu D. Vargot
*Attorney, Agent, or Firm*—Bruce J. Hendricks

[57] ABSTRACT

Expandable bladders for use in curing presses for hydrocarbon rubbers such as pneumatic tires are a crosslink elastomer comprising isobutylene repeat units and include graphite. A preferred isobutylene elastomer is a brominated copolymer of isobutylene and p-methylstyrene. The bladders have enhanced lubricity, low adhesion to tire innerliners, and lower hot tension set. The above enhancements allow hydrocarbon rubbers such as tires to be molded with fewer defects caused by abraded or deformed bladders. They also enhance the useful life of the bladder reducing the cost of tire curing.

21 Claims, No Drawings

5,538,218

1

TIRE CURING BLADDER WITH IMPROVED RELEASE FROM THE TIRE INNERLINER

FIELD OF INVENTION

This invention relates to tire curing bladder having therein graphite and butyl rubber polymers or copolymers including halogenated butyl rubbers and/or halogenated copolymers of p-methylstyrene and isobutylene. It also relates to a method of curing tires utilizing such a bladder.

BACKGROUND OF THE INVENTION

Conventionally pneumatic rubber vehicle tires are produced by molding and curing a green or uncured and unshaped tire in a molding press. The green tire is pressed outwardly against a mold surface (sometimes called a negative mold surface) by means of an inner fluid-expandable bladder. By this method the green tire is shaped against the outer mold surface which defines the tire tread pattern and configuration of the side-walls. By application of heat and pressure the tire is molded and cured at elevated temperatures.

In general practice, the expansion of the bladder is accomplished by application of internal pressure to the inner bladder cavity which is provided by a fluid such as gas, hot water and/or steam which also participates in the transfer of heat for the curing or vulcanization of the tire. The tire after molding and curing is allowed to cool somewhat in the mold, some times aided by adding cold or cooler water to the bladder. Then the mold is opened, the bladder is collapsed by removal of its internal fluid pressure and the tire is removed from the tire mold. Such use of tire curing bladders is well known to those having skill in the art.

It is recognized that there is substantial relative movement between the outer contacting surface of the bladder and the inner surface of the tire during the expansion phase of the bladder. Likewise, there is considerable relative movement between the outer contacting surface of the bladder and the cured inner surface of tire during the collapse and the stripping of the bladder from the tire after the tire has been molded and vulcanized.

The bladder surface can tend to stick to a tire inner surface after the tire is cured and during the bladder collapsing part of the tire cure cycle. This adhesion may cause roughening of the bladder surface if it is not controlled. This reduces bladder durability and can produce defective tires. For this reason, it is conventional practice to precoat the inner surface of the green or uncured tires with a lubricant in order to provide lubricity between the outer bladder surface and inner tire surfaces during the entire molding operation. This lubricant has also been called a bladder lubricant, and is often a silicone polymer dispersed in a solvent or water.

It is to be appreciated that the release of the tire from its cure bladder in an industrial manufacturing setting is intimately associated with both the phenomenon of release (to prevent sticking) and the phenomenon of lubrication (to enhance slipping) between the bladder and the adjacent tire surfaces. The release aspect refers to the basic ability to avoid adhesion, or release and the aspect of lubrication relates to enhancing the ability of the surfaces to slip and enable a movement of the bladder with respect to the tire.

Butyl rubber is commonly used in tire curing bladders. Butyl rubber is a copolymer of predominantly isobutylene with small amounts of diene monomers, usually isoprene to

2 give sufficient unsaturation to allow the butyl rubber to be crosslinked. Copolymers of isobutylene and para-methylstyrene which are subsequently brominated are being manufactured by Exxon. These polymers are useful in many applications where butyl rubber is used.

U.S. Pat. No. 4,863,650 disclosed the use of fillers such as kaolin, chalk, rock dust, silicas, carbon black and graphite in silicone release agent films to result in mat finishes. U.S. Pat. No. 4,310,427 disclosed the use of dry powders such as mica, talc, and graphite which were dusted onto the interior surfaces of "green" tires to provide lubrication and release. U.S. Pat. No. 3,967,978 disclosed the use of fine solid particles such as mica or graphite in the lubricant.

Accordingly, it is desired to provide curing bladders with decreased adhesion to cured tires, increased flex life, and improved heat stability, specifically low, hot tension set.

SUMMARY OF THE INVENTION

Graphite was found to enhance lubricity (reduce the coefficient of friction), lower adhesion of cured tire innerliners to butyl rubber curing bladders, and reduce bladder growth (lower the hot tension set). Brominated copolymers of isobutylene and p-methyl-styrene were found to have enhanced heat stability in curing bladder applications and to have improved performance as curing bladders.

DETAILED DESCRIPTION OF THE INVENTION

The graphite that is desirably incorporated into the curing bladders may be natural or synthetic. The graphite is added during mixing of the bladder formulation and is therefore dispersed throughout the molded bladder. Natural graphite can be found in Madagascar, Ceylon, Mexico, Korea, Australia, USSR, and China. Synthetic graphite can be made from carbonaceous materials such as by heating petroleum coke to approximately 3,000° C. in an electric resistance furnace. A preferred graphite (to aid in uniform dispersion) is a powdery form such that greater than 80 weight percent of the graphite passes through a 325 mesh U.S. Standard screen, more desirably greater than 90 weight percent and preferably greater than 99 weight percent passes through said screen mesh. Such a synthetic graphite was used in Table I and is available as synthetic 1442 from Dixon in Ticonderoga, N.J., U.S.A.

The graphite is desirably used in amounts from 0.1 to 30 phr, more desirably from 0.5 to 20 phr, and preferably from 1 to 5, 10, or 15 phr. The term phr refers to parts by weight per one hundred parts by weight rubber in a rubber composition. The term phr is a standard term used by most rubber formulators as it facilitates formulation changes and comparisons when all ingredients are measured in relation to one hundred parts of the rubber rather than the total formulation weight. Rubbers or rubbery polymers are crosslinkable, predominantly noncrystalline polymers with Tg values below 0° C. and preferably below −20° C.

The preferred rubber for this application is a polymer of at least iso-olefin and para-alkylstyrene which is desirably brominated. The iso-olefins may have from 4 to 7 carbon atoms. The alkyl of para-alkylstyrene may have from 1 to 11 carbon atoms. Desirably, at least 50 weight percent, more desirably at least 75, 80, 85 or 95 weight percent of the rubbers of the bladder formulation are one or more polymers having at least repeat units from one or more iso-olefin and paraalkylstyrene. Desirably, the one or more iso-olefin is 80, 90, or 95 weight percent or more isobutylene. Desirably, the para-alkyl-styrene is 80, 90, or 95 weight percent or more para-methylstyrene. Desirably the isobutylene polymer comprises is from 1 to 20 weight percent para-methylstyrene, and more desirably from 2 to 15 weight percent para-methylstyrene. Desirably the isobutylene polymer comprises from 80 to 9.9 weight percent isobutylene and more desirably from 85 to 98 weight percent. Desirably the bromine content is up to 5 weight percent and preferably from about 0.2 to 1.5 or 2.5 weight percent in the polymer. Diene monomers having 4 to 8 carbon atoms are optionally present up to 5 or 8 weight percent, desirably from 0.5 to 3 weight percent. The preferred copolymer of isobutylene and para-methylstyrene is essentially free of isoprene and other conjugated dienes. A highly preferred brominated butyl rubber is Exxpro™ with a Mooney Viscosity ML (1+8) 125° C. of 50 plus or minus five, an isobutylene content of 94 or 95 weight percent, and a para-methylstyrene content of about 5 weight percent, with a total bromine content of 0.8 weight percent. A European Patent Application having Publication No. 0,344,021 describes how to make such polymers and is hereby incorporated by reference.

Optionally, other butyl rubbers may be used in combination with the isobutylene-para-methylstyrene copolymers or in lieu thereof. Desirably at least 50 weight percent and more desirably at least 75, 80, 85 or 90 weight percent of all the rubbery polymers of the bladder composition are a butyl rubber polymer from isobutylene and one or more conjugated dienes, preferably isoprene. Desirably, the isoprene is from 1 to 5 weight percent and the remainder (e.g. from 95 to 99 weight percent) is isobutylene. These include butyl rubber, halogen substituted butyl rubbers such as chlorobutyl and bromobutyl. Small amounts (e.g. less than 10 or 20 weight percent of all rubbery polymers) of diene based elastomers such as neoprene rubber may be included as cure accelerators or for other purposes. Neoprene rubber is also known as poly(chloroprene). It is a common co-curative in resin cure systems as described below. In rubber formulations the neoprene is counted towards the 100 parts by weight rubber even though it has a separate function as a halogen containing elastomer. Desirably the 100 parts rubber of the bladders are at least 50, 75, 80, 85 or 90 weight percent polymers or copolymers of isobutylene.

The butyl rubber bladder can be cured with sulfur cure or resin cure systems. Sulfur cure systems are less preferred with isobutylene polymers having residual unsaturation as reversion and/or increasing modulus during use as a curing bladder can result. Representative resins for curing include conventional phenolic-resins used in an amount from 1 to 10 phr. A resorcinol or formaldehyde resin cure system is often used for such purposes. Such cure systems for bladder compositions are well known to those having skill in the art. For an example, see U.S. Pat. No. 3,031,423 which is hereby fully incorporated by reference. A resin cure system using phenol-formaldehyde, along with a small amount of sulfur is shown in Table I. Reactive phenolformaldehyde resins for curing butyl rubbers are commercially available and well known to the art.

The cured rubber composition of the curing bladder may also contain conventional additives including fillers, peptizing agents, stearic acid, accelerators, sulfur vulcanizing agents, reactive resins for curing, antiozonants, antioxidants, processing oils, activators, initiators, plasticizers, waxes, prevulcanization inhibitors, extender oils, and the like.

If a sulfur cured system is to be used the amount of sulfur is desirably from 0.1 to 10 (phr) parts by weight per 100 parts rubber. Representative of sulfur vulcanizing agents include sulfur; sulfur donating agents, for example amine disulfide, polymeric polysulfide, or sulfur olefin adducts. The abbreviation phr will be used in this text to designate parts by weight per 100 parts by weight of rubber in a bladder or tire composition. Preferably the amount of sulfur is between 0.5 and 7 phr.

Accelerators for sulfur cured systems may be used in amounts from 0.1 to 5 phr more desirably from 0.5 to 2.5 phr. These types of accelerators are well known and include amines, disulfides, guanidines, thioureas, thiols, thiazoles, thiurams, sulfenamides, dithiocarbamates and xanthates. As classes, many of these accelerators are either too fast or too slow for curing bladder systems but they may be used in small amounts or specific compounds in each group may be appropriate for use in curing bladders. Blends of two or more accelerators may also be used.

Fillers include reinforcing fillers such as carbon black which can be used in amounts from about 25 to 75 or 85 phr. Typical carbon blacks that are used include acetylene blacks, N110, N121, N220, N231, N234, N242, N293, N299, N326, N330, M332, N339, N343, N347, N351, N358, N375, N472, N539, N550, N660, N683, N754, and N765.

Antioxidants and antiozonants may desirably be added to the curing bladder composition. Antioxidants prevent oxidative crosslinking or oxidative chain scission so that the modulus and fracture properties of the rubber are unchanged during exposure to oxidation especially at elevated temperatures. Antioxidants for rubber compounds in general and for butyl rubber more specifically are well known to the art. Desirable amounts are from 0.1 to 10 phr and more desirably from about 2 to 6 phr. Antiozonants are compounds that prevent chain scission due to exposure to ozone. They are also well known to the art. Antioxidants and antiozonants include monophenols, bisphenols, thiophenols, polyphenols, hydroquinone derivatives, phosphites, phosphate blends, thioesters, naphthylamines, diphenolamines, as well as other diaryl amine derivatives, para-phenylene diamines, quinolines and blended amines.

Fillers are desirably incorporated into the curing bladder compositions. They may be used in amounts from 0 to 200 phr and more desirably from 30 to 100 phr. A preferred filler is carbon black which is available in various particle sizes and with different surface reactivities from vendors such as Degussa. Reinforcing type fillers are preferred for use in curing bladders. Silica may be used in addition to carbon black. Silicas are generally described as precipitated silicas, fume silicas and various naturally occurring materials having substantial amounts of $SiO_2$ therein.

The graphite being related to carbon black may be referred to in the bladder formulation as a partial replacement for some of the carbon black. However the graphite performs a different function than the carbon black and the reduction in the amount of carbon black used is to maintain or nearly maintain a desirably ratio of binder (rubbers) to fillers.

Various oils and waxes may be used in curing bladder formulation depending upon the compatibility of the oils and waxes with the butyl rubber and the other components of the rubber formulation. They may be uniformly dispersed or they may purposefully tend to phase separate from the composition (migrate to the surface). Waxes include microcrystalline wax and paraffin wax. Oils include aliphatic-naphthenic aromatic resins, polyethylene glycol, petroleum oils, ester plasticizers, vulcanized vegetable oils, pine tar, phenolic resins, petroleum resins, polymeric esters, and rosins. Oils and waxes can be used in amounts from 0 to 20 phr and more desirably from 1 to 10 phr. They are usually considered plasticizers and modulus modifiers. Fatty acids such as stearic acid, palmitic acid and oleic acid may be used in amounts from about 0.1 to 5 phr with a range of from about 0.2 to 1 phr being preferred. Zinc oxide may be present in amounts from about 0.5 phr to about 10 phr.

A procedure for mixing and molding curing bladders in general and for the examples is given below. In a Banbury mixer or the equivalent the rubber polymers, 80 weight percent of the carbon black, the oils, waxes, zinc oxide, and optionally graphite (if desired) were mixed until the mix temperature reached 165° C. The material was dumped onto a sheet-off mill and cooled. The cooled material was added to a Banbury mixer or equivalent in the second mixing stage. Then the other 20 weight percent carbon black was added during mixing until the Banbury mix temperature reached 150° C. The material was again dumped onto a sheet-off mill and cooled. In the third mixing stage the curatives (including any neoprene rubber, resin, accelerators, and sulfur) were added and mixed until the mix temperature reached 115° C. The material was then dumped and cooled.

The curing bladder may be molded in an injection molding machine or a transfer molding machine. If transfer molding is selected the material from the Banbury is extruded as a slug. A cure meter is used to determine the approximate time to develop optimal cure at specific temperatures. The actual cure time will depend on heating rate and the gauge (thickness) of the curing bladder. The curing bladder desirably will have a toroidal shape. The curing bladder material tested in the examples was cured for 60 minutes at 171° C.

The curing bladders of this invention are useful for molding and curing various hydrocarbon materials including pneumatic vehicle tires and miscellaneous pneumatic tires for non-vehicle applications. Other hydrocarbon articles cured in bladder equipped presses include hoses, various sleeves, and air springs (a shock absorbing spring for commercial vehicles). The curing bladders have good lubricity, desirable release characteristics from cured hydrocarbon rubbers, and extended use lifetimes due to their enhanced lubricity.

Typical properties of a curing bladder as produced are desirably a 300% Modulus of 4.0 to 8.0 MPa, a Breaking Strength of 5 to 14 MPa, an Elongation at Break of 400 to 1,000%, a Shore A Hardness of 35 to 65, a Hot Tension Set ASTMD412 16 hrs at 50% elongation and 190° C. of 5 to 20%, and a Hot Peel Adhesion to a butyl rubber innerliner of 40 to 100N. More desirably the curing bladder has a 300% Modulus of 4 to 6, a Breaking Strength of 8 to 11 MPa, an Elongation at Break of 600 to 800, a Shore A hardness of 40 to 50, a Hot Tension Set of 12 to 17%, and a Hot Peel Adhesion of 45 to 90. The properties of a curing bladder after aging 24 hours at 177° C. desirably include an Elongation at Break of 300 to 800% more desirably 300 to 500%, a 300% Modulus of 4.5 to 7.5 MPa, a Breaking Strength of 4.5 to 7.5 MPa, a Shore A hardness of 55 to 65, a Hot Tension Set of 13.0 to 18.0% and a Coefficient of Friction with lubrication ASTMD4518 of 0.4 to 1.0.

The following Table I shows a Control and Example I of butyl rubber curing bladders. Example I and its control show the effect of graphite on bladder properties.

TABLE I

|  | Control (parts by weight) | Example 1 (parts by weight) |
|---|---|---|
| Brominated Copolymer of Isobutylene and p-methylstyrene (Exxpro ™) | 100 g | 100 g |
| Carbon Black | 55.0 | 55.0 |
| Processing Oil | 6.0 | 6.0 |
| Graphite (Synthetic 1442) | 0 | 3.0 |
| Processing Aids[1] | 5.50 | 5.50 |
| Curatives[2] | 9.15 | 9.15 |
| Sulfur | 0.75 | 0.75 |
| Physical Properties before Aging |  |  |
| Break Strength MPa | 9.78 | 9.64 |
| Elongation at Break % | 748 | 730 |
| Shore A Harness 100° C. | 45 | 47 |
| Hot Tension Set % 16 hrs. 190° C., 50% elongation | 22 | 19 |
| Hot Peel Adhesion to Self (no lubricant) N | 109 | 82 |
| Coefficient of Friction against Innerliner (no lubricant) | 3.71 | 3.45 |
| 95° C. Peel Adhesion to Halobutyl Innerliner (Newtons) (no lubricant) | 40 | 11 |
| Hot Tension Set % 16 hrs. 190° C., 50% elongation | 22 | 22 |
| Hot Tension Set %[3] 16 hrs. 190° C., 50% elongation | 30 | 20 |

[1]Mixture of wax, processing oil and fatty acid
[2]Mixture of zinc oxide, accelerator reactive phenol-formaldehyde resin, and sulfur
[3]After 24 hrs. at 177° C. in air Table I shows the difference in a curing bladder composition resulting from incorporation of 3.0 phr graphite. Brominated isobutylene-para-methylstyrene was the rubbery polymer used in both Example I and the control. The graphite was added in the first mixing step of a three mixing step procedure to obtain good dispersion thereof. Reactive phenol-formaldehyde curatives were used along with sulfur type curatives. The brominated isobutylene-para-methylstyrene could serve as a halogen source. The modulus was slightly higher in Example I than in the control. The hot Peel adhesion to self was slightly lower in Example 1 but was high enough to be acceptable. The coefficient of friction against an innerliner was reduced in the Example, which is desirable. The 95° C. Peel adhesion to halobutyl innerliner was reduced by 72.5 percent, which is very desirable. Low values in the hot tension set tests are desirable because they indicate resistance to bladder growth during use. Bladder growth is where the bladder stretches and becomes larger. This makes tire curing more difficult and increases the probability of shaping and curing defects.

The tensile tests on the samples are well known to the art and generate the modulus, break strength, and elongation values.

The Peel adhesion test measures interfacial adhesion between two different substrates at 95° C. Interface modifiers (if desired) are added to the interface of the bladder substrate before the test is made. These include an emulsifiable silicone oil dispersed in water and thickened with a fumed silica. A Mylar™ (polyester) sheet having laterally placed windows cut therein (5 mm wide by 100 mm longer) is placed between the bladder material and a second substrate which can be an uncured tire innerliner material or another bladder substrate. The window in the Mylar™ sheet creates a known area of interfacial adhesion between the bladder sample and the other substrate such as the tire innerliner sample. A fabric backing is applied to bladder material and the other substrate and is secured with adhesive and/or stitching. The assembled sample of the two substrates with their fabric backing and Mylar sheet undergo a curing cycle is cured in a diaphragm curing mold for 28 minutes at 150° C. with 100 psi pressure (0.69 MPa) in the diaphragm. After this process the assembled sample is cut in 1 inch (2.54 cm) wide strips with the window portion of the Mylar longitudinal and centered therein, the two substrate materials are separated slightly by hand operation. They are then mounted in an Instron™ type force displacement tester in a configuration such that the peel angle between the separated substrates is 180°. The force displacement tester separates the substrates at a rate of 51 mm/min and records the force used. The average force used over the adhered area divided by the sample width is recorded as the adhesion value.

The curing bladders described herein are useful in bladder or diaphragm type curing presses to cure hydrocarbon rubber compositions and preferably pneumatic tires. These presses desirably have one or more molding surfaces besides the diaphragm or bladder. The uncured hydrocarbon composition is placed in the mold, the mold is closed, and the bladder or diaphragm is inflated (expanded usually with a heated gas such as steam). This sandwiches the uncured composition between the bladder or diaphragm and the one or more other mold surfaces. The hydrocarbon rubber typically flows and conforms to the one or more other mold surfaces which are often a metal or alloy thereof and rather rigidly fixed during the molding operation. Further heating of the uncured composition causes it cure (also called vulcanization or crosslinking) which solidifies the final shape of the article conforming to the one or more rigid mold surfaces. The bladder or diaphragm is then deflated (removing the internal pressure) to facilitate removal of the molded parts. Depending on the shape of the article, one or more of the other molding surfaces may physically move to open the mold thereby further facilitating part removal.

While in accordance with the patent statutes the best mode and preferred embodiment has been set forth, the scope of the invention is not limited thereto, but rather by the scope of the attached claims.

What is claimed is:

1. In a curing press for a hydrocarbon rubber composition which uses an expandable bladder to assist in shaping and curing said composition the improvement wherein said bladder consist essentially of a formulated rubber composition and from about 0.1 to about 30 parts by weight of graphite dispersed throughout said formulated rubber composition, said formulated rubber composition comprising one or more rubbery polymers including at least 50% by weight of one or more isobutylene rubbery polymers, wherein said formulated rubber composition after curing and after aging at 177° C. for 24 hrs has an elongation to break from 300 to 800%, and wherein said parts by weight are based on 100 parts by weight of the rubbery polymers in said formulated rubber composition.

2. In a curing press according to claim 1, wherein the one or more isobutylene rubbery polymers are comprised of either one or more polymers of from 90 to 99 weight percent isobutylene and from 1 to 20 weight percent para-alkylstyrene or one or more polymers of from 95 to 99 weight percent isobutylene and from 1 to 5 weight percent of at least one conjugated diene or combinations thereof and wherein said one or more isobutylene rubbery polymers are at least 75 weight percent of said rubbery polymers of said bladder.

3. In a curing press according to claim 1, wherein said expandable bladder is filled with a hot fluid during use wherein said graphite is present from about 0.5 to about 20 parts by weight, and wherein said at least 75 weight percent of said rubbery polymers of said bladder are comprised of one or more polymers of from 95 to 99 weight percent isobutylene and from 1 to 5 weight percent of at least one conjugated diene.

4. In a curing press according to claim 2, wherein said graphite is present from about 0.5 to about 20 parts by weight, and wherein said at least 75 weight percent of said rubbery polymers of said bladder is comprised of one or more copolymers of from 80 to 99 weight percent isobutylene and from 11 to 20 weight percent para-alkylstyrene and said copolymers are brominated polymers.

5. In a curing press according to claim 3, wherein said one or more isobutylene polymers comprise at least 80 weight percent of all the rubbery polymers in said expandable bladder.

6. In a curing press according to claim 4, wherein said one or more brominated polymers of isobutylene and para-methylstyrene are at least 80 weight percent of all the rubbery polymers in said expandable bladder.

7. In a curing press according to claim 6, wherein said formulated rubber composition was cured with a phenol-formaldehyde resin cure system.

8. In a curing press according to claim 5, wherein said formulated rubber composition was cured with a phenol-formaldehyde resin cure system.

9. An expandable curing bladder consisting essentially of a formulated rubber composition and from about 0.1 to about 30 parts by weight of graphite dispersed throughout said formulated rubber composition, said formulated rubber composition comprising:

one or more rubbery polymers including one or more isobutylene rubbery polymers, wherein said isobutylene rubbery polymers are at least 50 weight percent isobutylene units, and are present as at least 50 weight percent of the rubbery polymers of said bladder and one or more curatives for said one or more isobutylene rubbery polymers wherein said parts by weight are based upon 100 parts by weight of said one or more rubbery polymers in said bladder and wherein said formulated rubber composition after curing and after aging at 177° C. for 24 hrs has an elongation at break of from 300% to 700%.

10. An expandable curing bladder according to claim 9, wherein at least 75 weight percent of said one or more isobutylene polymers are one or more polymers comprised of from 80 to 99 weight percent isobutylene and from 1 to 20 weight percent para-methylstyrene and wherein said graphite is present from about 0.5 to about parts by weight.

11. An expandable curing bladder according to claim 9, wherein said one or more rubbery polymers of said expandable bladder are comprised of at least 75 weight percent polymers of from 95 to 99 weight percent isobutylene and from 1 to 5 weight percent of at least one conjugated diene.

12. An expandable curing bladder according to claim 10, wherein said one or more polymers of iso-butylene and para-methylstyrene are brominated.

13. An expandable curing bladder according to claim 12, wherein at least 90 weight percent of said graphite is capable of passing through a 325 mesh screen.

14. An expandable curing bladder according to claim 12, wherein said rubbery polymers are crosslinked with a phenol-formaldehyde resin cure system.

15. A method of using an expandable rubber bladder to cure a hydrocarbon rubber, said method comprising:

inserting an uncured rubber composition into a curing mold having an expandable rubber bladder positioned therein and one or more molding surfaces, wherein the expandable bladder consists essentially of a formulated rubber composition and from about 0.1 to about 30 parts by weight of graphite dispersed throughout said formulated rubber composition, said formulated rubber composition comprising:

at least 50 parts by weight of one or more isobutylene polymers having at least 50 weight percent isobutylene units, optionally other rubbery polymers, and one or more curatives for said one or more isobutylene polymers, and wherein said parts by weight are based upon 100 parts by weight of said one or more isobutylene polymers and said optional rubbery polymers in said bladder and wherein said formulated rubber composition of said bladder after curing and aging at 177° C. for 24 hrs has an elongation at break of from 300 to 800%, closing the mold and expanding the bladder by application of heat and fluid in the internal portion of said bladder cavity to expand the bladder outwardly against an inner surface of the uncured hydrocarbon rubber to force said uncured hydrocarbon rubber against the one or more molding surfaces, curing the hydrocarbon rubber under conditions of heat and pressure, deflating said expandable bladder, and removing the cured hydrocarbon rubber from said curing mold.

16. A method according to claim 15, wherein said graphite is present in amounts from about 0.5 to about 20 parts by weight.

17. A method according to claim 15, wherein 75 weight percent or more of said one or more isobutylene polymers and said optional other rubbery polymers are one or more copolymers comprised of from 80 top 99 weight percent isobutylene and from 1 to 20 weight percent para-methylstyrene, and wherein said graphite is present from about 0.5 to about 20 parts by weight.

18. A method according to claim 17, wherein said one or more copolymers comprised of isobutylene and para-methylstyrene are brominated.

19. A method according to claim 18, wherein said hydrocarbon rubber is cured into a pneumatic tire.

20. A method according to claim 15, wherein 75 weight percent or more of said one or more isobutylene polymers and said optional other rubbery polymers are one or more copolymers comprised of from 95 to 99 weight percent isobutylene and from 1 to 5 weight percent of at least one conjugated diene and wherein said graphite is present from about 0.5 to about 20 parts by weight.

21. In a curing press according to claim 6, wherein said bladder has a toroidal shape and said hydrocarbon rubber compositions are fiber reinforced pneumatic tires.

* * * * *